(12) United States Patent
Hsu et al.

(10) Patent No.: US 8,152,350 B2
(45) Date of Patent: Apr. 10, 2012

(54) SIDELIGHT-TYPE BACKLIGHT MODULE

(75) Inventors: Chih-Hua Hsu, Taipei Hsien (TW); Jung-Shiung Liau, Taipei Hsien (TW)

(73) Assignee: Wistron Corporation (TW)

( * ) Notice: Subject to any disclaimer, the term of this patent is extended or adjusted under 35 U.S.C. 154(b) by 0 days.

(21) Appl. No.: 12/813,670

(22) Filed: Jun. 11, 2010

(65) Prior Publication Data
US 2011/0019434 A1    Jan. 27, 2011

(30) Foreign Application Priority Data
Jul. 24, 2009 (TW) .............................. 98125036 A (51) Int. Cl.
*F21V 8/00* (2006.01)
(52) U.S. Cl. ....................................... 362/613; 362/612
(58) Field of Classification Search .................. 362/612, 362/613, 617
See application file for complete search history.

(56) References Cited

U.S. PATENT DOCUMENTS

| 7,488,103 B2 * | 2/2009 | Watanabe et al. ............. 362/607 |
| 2008/0151141 A1 * | 6/2008 | Huang et al. .................... 349/65 |
| 2008/0225203 A1 * | 9/2008 | Kim ................................ 349/65 |
| 2009/0086505 A1 * | 4/2009 | Iwasaki et al. ................ 362/612 |
| 2009/0303744 A1 * | 12/2009 | Iwasaki ........................ 362/612 |

FOREIGN PATENT DOCUMENTS

| TW | M319429 | 1/2009 |
| TW | M356138 | 5/2009 |

OTHER PUBLICATIONS

Chinese Office Action dated Sep. 8, 2011 issued in connection with counterpart Chinese Patent Application No. 200910162525.1, including brief English language translation (5 pages).

* cited by examiner

*Primary Examiner* — Laura Tso
(74) *Attorney, Agent, or Firm* — Ostrolenk Faber LLP (57) ABSTRACT

A sidelight-type backlight module includes a casing body, a light-guiding plate, a reflector plate, a light-emitting unit, and a reflector component. The reflector plate is disposed at a surface of the light-guiding plate, and has an extension part extending beyond a side edge of the light-guiding plate that faces toward the light-emitting unit. The reflector component has a light-reflecting face spaced apart from the reflector plate. The light-emitting unit is disposed between the extension part and the light-reflecting face. The extension part and the light-reflecting face reflect light of the light-emitting unit into the light-guiding plate so that a lamp reflector can be omitted. Preferably, the reflector component is formed integrally with the casing body.

13 Claims, 8 Drawing Sheets

FIG. 1

PRIOR ART

SIDELIGHT-TYPE BACKLIGHT MODULE

CROSS-REFERENCE TO RELATED APPLICATION

This application claims priority of Taiwanese Application No. 098125036, filed on Jul. 24, 2009.

BACKGROUND OF THE INVENTION

1. Field of the Invention

The present invention relates to a sidelight-type backlight module, more particularly to a light-reflecting mechanism of a sidelight-type backlight module.

2. Description of the Related Art

Figure 1:
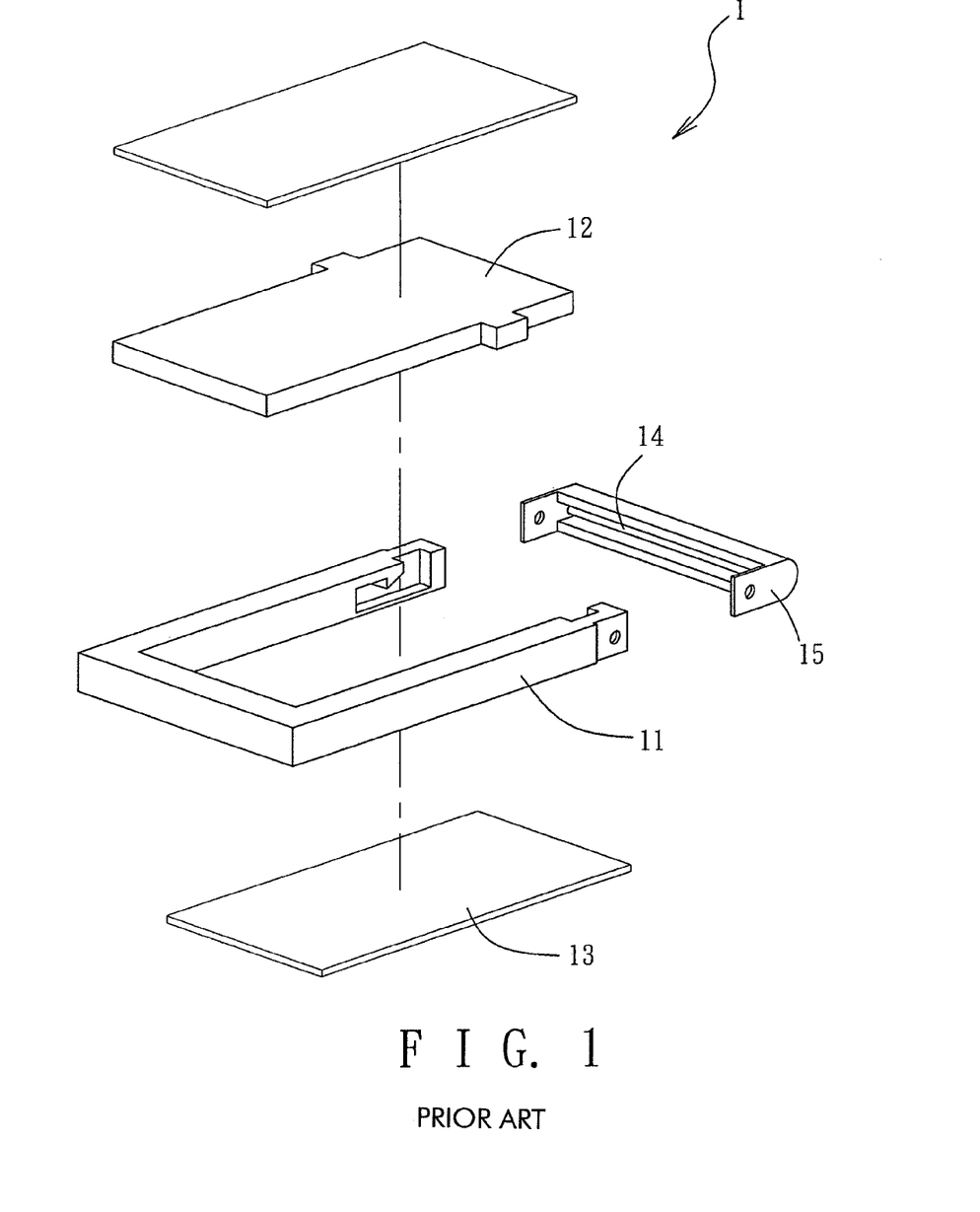
FIG. 1 is an exploded perspective view of a backlight module disclosed in Taiwanese Utility Model No. M356138.

Referring to FIG. 1, Taiwanese Utility Model No. M356138 discloses a backlight module 1 including a frame 11, a light-guiding plate 12 disposed in the frame 11, a reflector plate 13 disposed on a bottom side of the light-guiding plate 12, a lamp tube 14 disposed at the frame 11 and facing toward a side edge of the light-guiding plate 12, and a lamp reflector 15 in which the lamp tube 14 is secured.

A conventional backlight module includes main components substantially similar to those of the backlight module 1, in which the lamp reflector 15 secures the lamp tube 14 and reflects light thereof toward the light-guiding plate 12.

Furthermore, Taiwanese Utility Model No. M319429 discloses a light-emitting diode backlight module, in which light-emitting diodes are used instead of a cold cathode lamp. Nevertheless, although light-emitting diodes have relatively higher efficiency, they are susceptible to heat dissipation problems, which, in turn, compromises the lifespan thereof. Therefore, the heat dissipation efficiency needs to be taken into account if light-emitting diodes are used as a light source of a backlight module.

SUMMARY OF THE INVENTION

Therefore, an object of the present invention is to provide a backlight module that does not require the above-mentioned lamp reflector of the prior art.

Another object of the present invention is to provide a backlight module that uses light-emitting diodes as the light source thereof and that has effective heat dissipation.

Accordingly, a sidelight-type backlight module of the present invention includes a casing body, a light-guiding plate, a light-emitting unit, a reflector plate, and a reflector component. The casing body defines a receiving space and includes a side frame strip. The light-guiding plate is disposed in the receiving space, has a side edge that faces toward the side frame strip, and has a surface. The light-emitting unit is disposed at the side frame strip of the casing body and includes a plurality of light-emitting diode members that face toward the side edge of the light-guiding plate. The reflector plate is disposed at the surface of the light-guiding plate and has an extension part that extends beyond the side edge of the light-guiding plate facing toward the light-emitting unit. The reflector component has a light-reflecting face that is spaced apart from the reflector plate. The light-emitting diode members are disposed between the extension part of the reflector plate and the light-reflecting face of the reflector component.

Through the above-mentioned arrangement of the extension part of the reflector plate and the light-reflecting face of the reflector component on two opposite sides of the light-emitting diode members, light emitted by the light-emitting diode members can be reflected into the light-guiding plate, such that the lamp reflector of a conventional backlight module is not required for light reflection purposes. In addition, the casing body is provided with the side frame strip for disposing the light-emitting unit, such that the lamp reflector of a conventional backlight module is not required for securing the light-emitting unit.

Preferably, the reflector component includes a reflector body that is connected to the side frame strip of the casing body.

Preferably, the sidelight-type backlight module further includes an outer frame and a heat-dissipating block. The outer frame is connected to the side frame strip of the casing body such that the light-emitting unit is disposed between the light-guiding plate and the outer frame. The light-emitting unit further includes a flexible circuit board on which the light-emitting diode members are disposed. The heat-dissipating block is disposed between and is in contact with the flexible circuit board and the outer frame. The outer frame is preferably made of a metallic heat-conductive material such that heat generated by the light-emitting diode members is conducted via the heat-dissipating block toward the outer frame for dissipation.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 2:
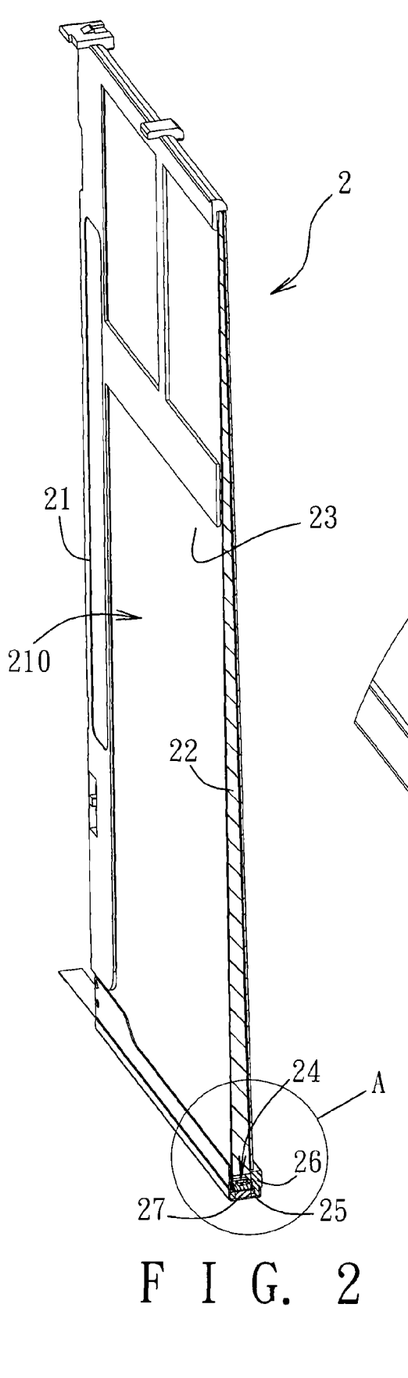
FIG. 2 is a perspective cutaway view of a sidelight-type backlight module according to the first preferred embodiment of the present invention.
Figure 3:
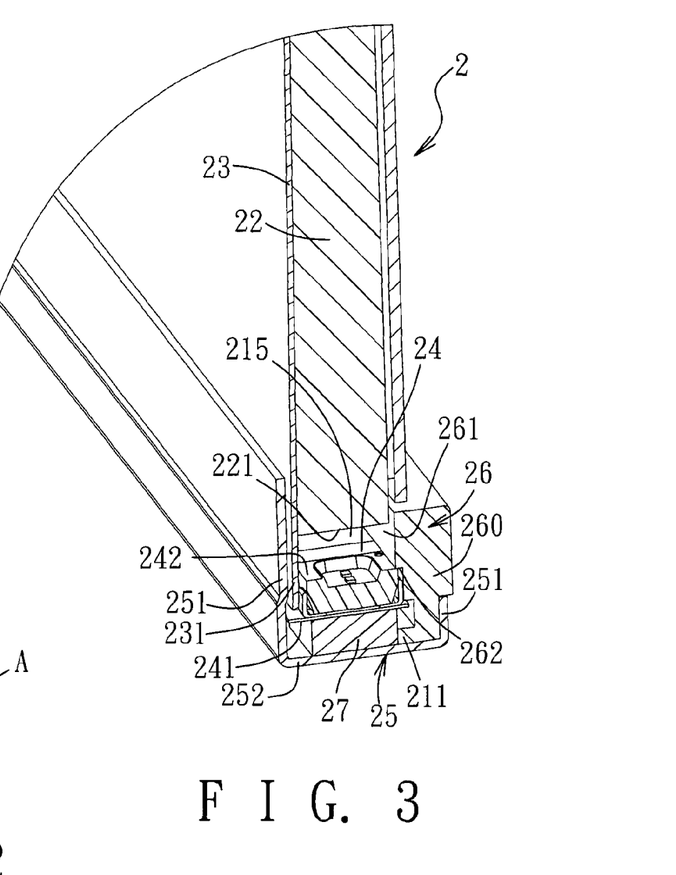
FIG. 3 is an enlarged view of encircled section A in FIG. 2.
Figure 4:
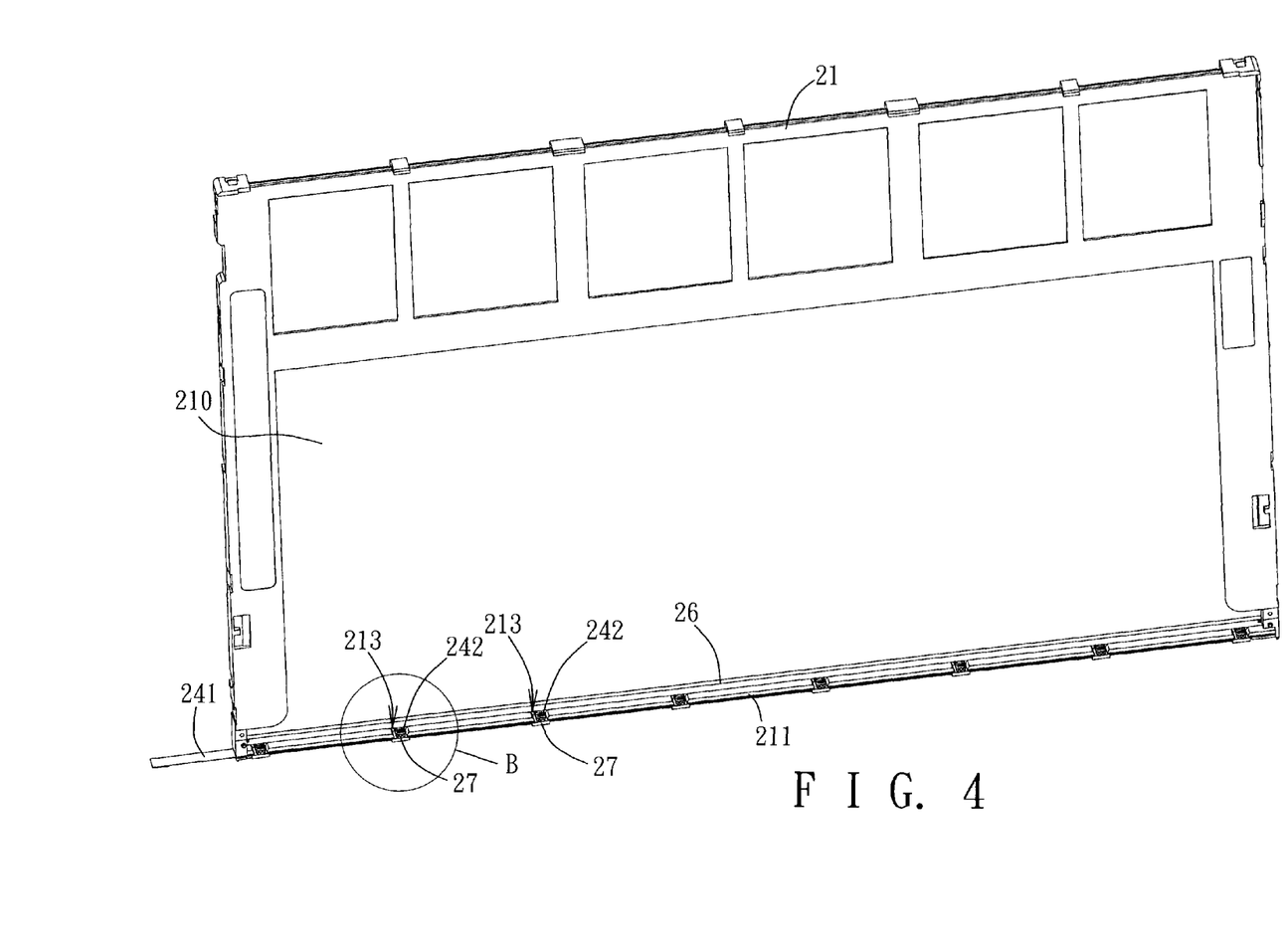
FIG. 4 is a perspective view of the first preferred embodiment illustrating the assembly relation of a casing body and a light-emitting unit.

Referring to FIGS. 2 and 3, a sidelight-type backlight module 2 of the first preferred embodiment according to the present invention includes a casing body 21, a light-guiding plate 22 disposed in the casing body 21, a reflector plate 23, a light-emitting unit 24, an outer frame 25 connected to the casing body 21, a reflector component 26, and a plurality of heat-dissipating blocks 27. Of course, the sidelight-type backlight module 2 further includes other components, such as a diffuser, a liquid crystal panel, and other optical components.

Referring to FIGS. 3 to 7, the casing body 21 is substantially frame-shaped, includes a side frame strip 211 that has a top face 215, and defines a receiving space 210 for receiving the light-guiding plate 22 and the reflector plate 23. The light-guiding plate 22 has a side edge 221. As shown in FIG. 3, the side edge 221 and the top face 215 face each other.

The side frame strip 211 is formed with a slit 212 along a lengthwise direction thereof and a plurality of second recesses 214 arranged along the lengthwise direction. The top face 215 of the side frame strip 211 is further formed with a plurality of first recesses 213 arranged along the lengthwise direction. The first recesses 213 are in spatial communication with the receiving space 210, and are in spatial communication with the second recesses 214 via the slit 212.

The light-emitting unit 24 includes an elongated flexible circuit board 241, and a plurality of light-emitting diode members 242 spaced apart from each other and disposed on the flexible circuit board 241. The spacing between, positions of, and number of the light-emitting diode members 242 can vary based on requirements. The light-emitting unit 24 is disposed at the side frame strip 211 of the casing body 21 and is spaced apart from the side edge 221 of the light-guiding plate 22. The flexible circuit board 241 is disposed inside the slit 212 of the side frame strip 211, such that the light-emitting diode members 242 are respectively disposed in the first recesses 213, and such that the light-emitting diode members 242 face and emit light toward the side edge 221 of the light-guiding plate 22. Furthermore, in the present embodiment, the flexible circuit board 241 has one end extending from the side frame strip 211, extending outwardly of the casing body 21, and connected directly to a DC power source (not shown).

Referring to FIG. 3, the reflector plate 23 is disposed at a surface of the light-guiding plate 22, and has an extension part 231 that extends beyond the side edge 221 that faces toward the side frame strip 211. In the present embodiment, the extension part 231 extends to one side of the light-emitting diode members 242.

The reflector component 26 has a light-reflecting face 261 spaced apart from the reflector plate 23 such that the light-emitting diode members 242 are disposed between the extension part 231 and the light-reflecting face 261. In this embodiment, the reflector component 26 is disposed at one side of the light-emitting unit 24 that is opposite to another side whereat the extension part 231 is disposed, and includes a reflector body 260 that is connected to the side frame strip 211 to form a structure having a substantially L-shaped cross-section. The light-reflecting face 261 is a surface of the reflector body 260 facing toward the light-emitting diode members 242. In the present embodiment, the casing body 21 is made of a white reflective material (such as the PC XQ83619 produced by Dow Chemical) so that the light-reflecting face 261 of the reflector component 26 is capable of reflecting light.

Figure 5:
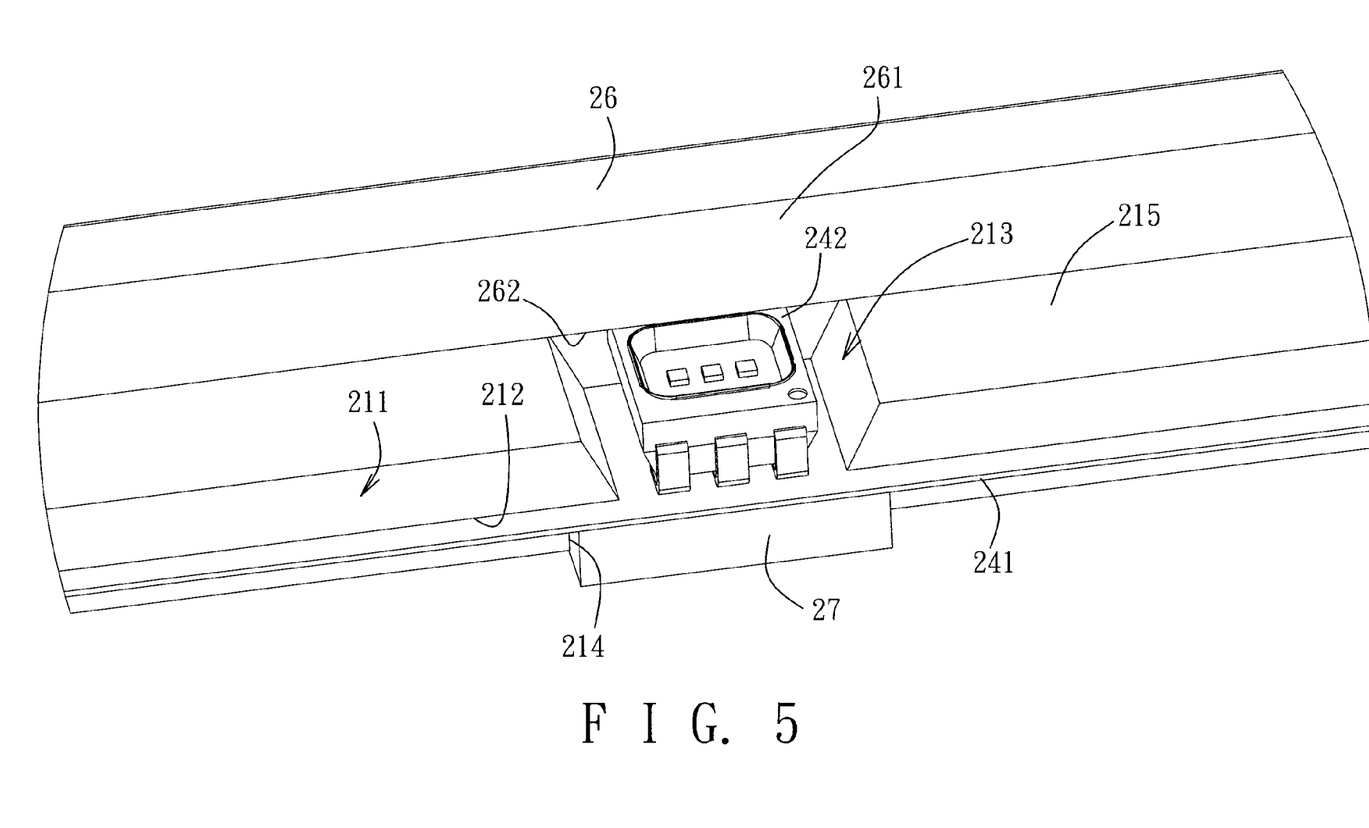
FIG. 5 is an enlarged view of encircled section B in FIG. 4.
Figure 6:
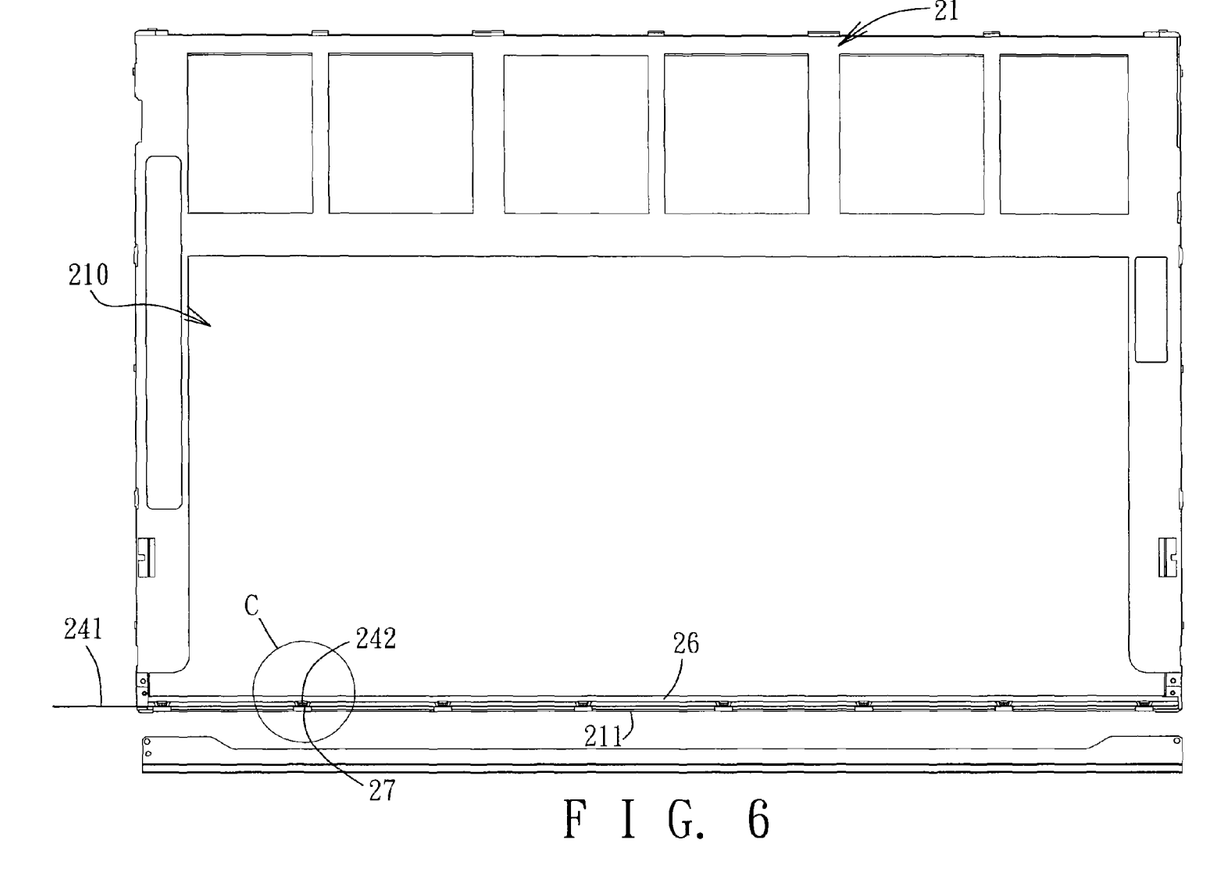
FIG. 6 is a front schematic view of the first preferred embodiment illustrating the assembly relation of the casing body and the light-emitting unit.

Referring to FIGS. 3 and 5, in the present embodiment, the light-reflecting face 261 faces the first recesses 213 and is recessed at positions corresponding to the first recesses 213 to form a plurality of inverted-L-shaped pressing shoulders 262 that press against one side of the light-emitting diode members 242 in the first recesses 213, respectively, thereby providing a positioning effect.

The outer frame 25 has a substantially U-shaped cross-section and includes two first wall parts 251 that are spaced from each other, and a second wall part 252 that interconnects the first wall parts 251. Each of the first wall parts 251 is disposed at an outer side of a respective one of the reflector plate 23 and the reflector component 26. The side frame strip 211 is disposed between the light-guiding plate 22 and the second wall part 252. The U-shaped structure of the outer frame 25 clamps the reflector component 26 and the reflector plate 23, such that the reflector component 26 and the extension part 231 of the reflector plate 23 are disposed respectively at the opposite sides of the light-emitting unit 24, and such that an inner space is formed between the light-guiding plate 22 and the light-emitting unit 24. The above-mentioned arrangement ensures that light reflected by the extension part 231 and the light-reflecting face 261 enters into the light-reflecting plate 22, and prevents leakage of light. Preferably, the outer frame 25 is made of a metallic heat-conductive material.

In the present embodiment, light of the light-emitting diode members 242 has four paths through which to enter the light-guiding plate 22: the first path is a direct path from the light-emitting diode members 242 to the side edge 221 of the light-guiding plate 22; the second path is from the light-emitting diode members 242 to the extension part 231 and then to the side edge 221; the third path is from the light-emitting diode members 242 to the light-reflecting face 261 and then to the side edge 221; and the fourth path, which is traveled by light reflected by the side edge 221, is from the side edge 221 to the top face 215 of the side frame strip 211 and then to the side edge 221. Therefore, the side frame strip 211 not only has the function of securing the light-emitting unit 24, the top face 215 of the side frame strip 211 is also capable of reflecting light.

Figure 7:
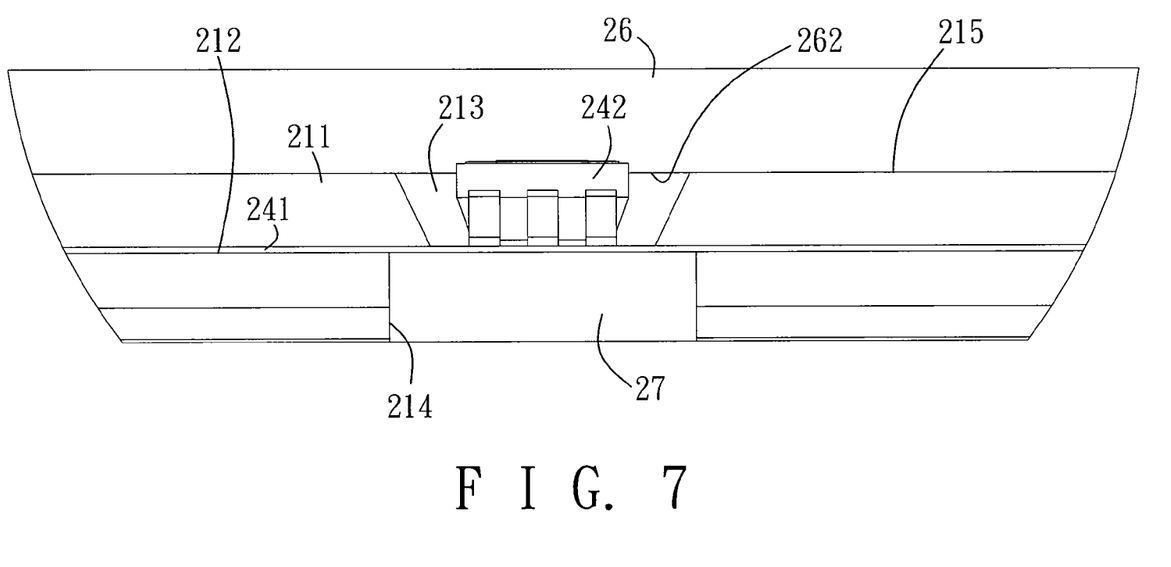
FIG. 7 is an enlarged view of encircled section C in FIG. 6.

Referring to FIGS. 3, 5, and 7, the heat-dissipating blocks 27 are respectively disposed in the second recesses 214, and are in contact with the flexible circuit board 241 and an inner surface of the second wall part 252. The flexible circuit board 241 has a first face and a second face opposite to the first face. The first face is provided with the light-emitting diode members 242. In the present embodiment, the heat-dissipating blocks 27 can be secured beforehand to the second face of the flexible circuit board 241. The heat-dissipating blocks 27 can be made of a heat-conductive material. Alternatively, the heat-dissipating blocks 27 can be replaced by heat-conducting pads, respectively. The heat-dissipating blocks 27 conduct heat generated by the light-emitting diode members 242 to the outer frame 25 for heat dissipation.

Figure 8:
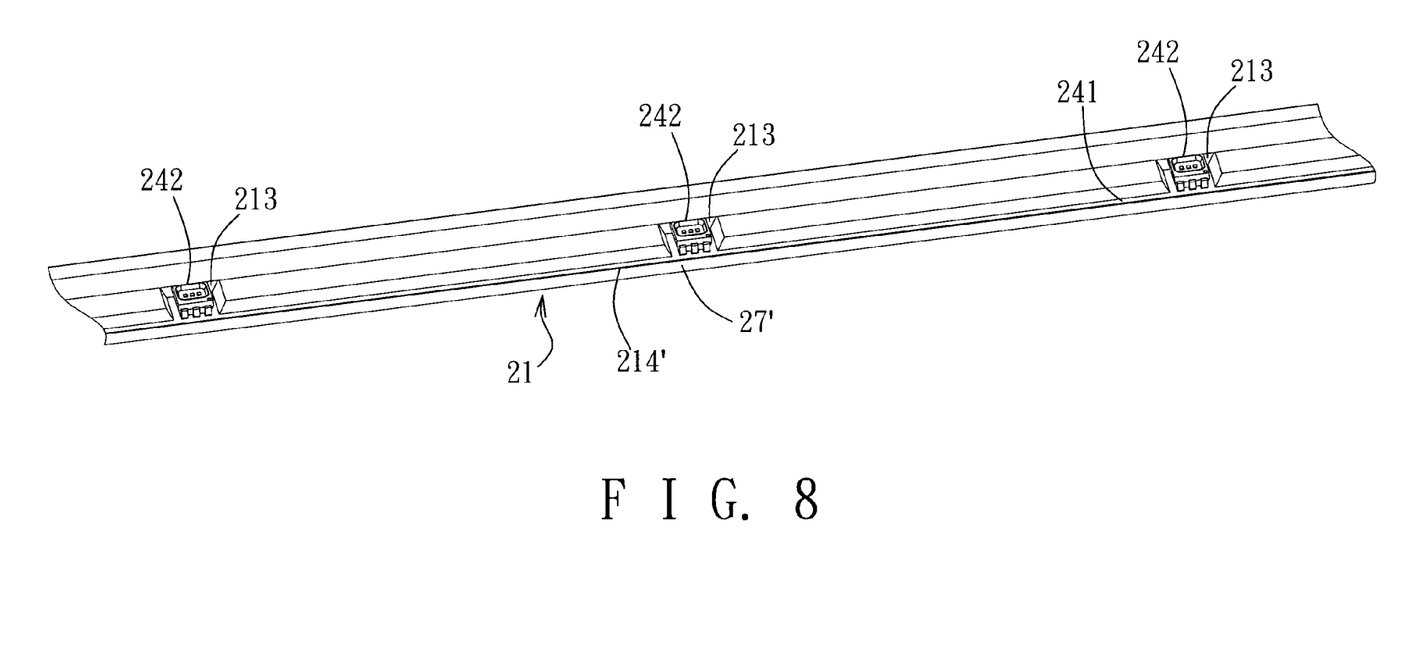
FIG. 8 is a fragmentary enlarged view of the second preferred embodiment illustrating the assembly relation of a second recess of a casing body and a heat-dissipating block.

Referring to FIG. 8, in the second preferred embodiment of the present invention, an elongated second recess 214' is formed along the lengthwise direction of the side frame strip 211, and an elongated heat-dissipating block 27' is disposed in the second recess 214'. The flexible circuit board 241 is disposed in the second recess 214' in an arrangement in which the heat-dissipating block 27' is disposed between and is in contact with the flexible circuit board 241 and the outer frame 25 (similar to FIG. 3). The elongated structure of the heat-dissipating block 27' increases the areas of contact thereof with the flexible circuit board 241 and the outer frame 25, respectively, so as to improve the heat dissipation.

Figure 9:
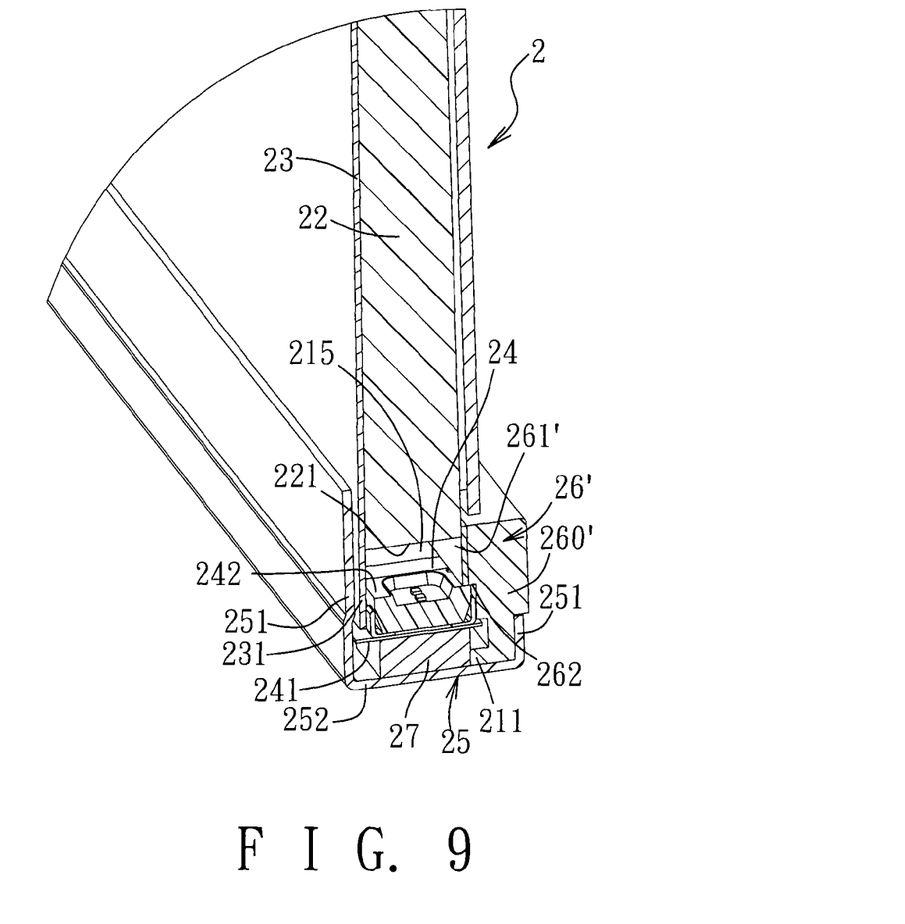
FIG. 9 is a fragmentary perspective cutaway view of the second preferred embodiment illustrating a reflector component of the sidelight-type backlight module.

It is to be noted that, in the above-mentioned embodiments, the light-reflecting face 261 of the reflector component 26 is a surface of the reflector body 260. However, in another embodiment, as shown in FIG. 9, the reflector component 26' has a reflector body 260', a surface of which has a light-reflecting film secured thereto to form the light-reflecting face 261'. The light-reflecting film can be a high reflectivity film produced by Mitsui Chemicals, a high reflectivity film produced by Mitsubishi Plastics, Inc., etc., and can have a polypropylene or a polyethylene terephthalate (PET) base.

In sum, the present invention replaces the lamp reflector used in a conventional backlight module by the arrangement in which the reflector plate 23 is extended toward the light-emitting unit 24 so as to reflect light, and the reflector component 26 is integrally formed with the casing body 21 so as to reflect light. Moreover, securing of the light-emitting unit is achieved by the above-mentioned arrangement. Furthermore, in the present invention, the heat-dissipating blocks 27, 27' are disposed between the light-emitting unit 24 and the outer frame 25 so as to conduct heat generated by the light-emitting diode members 242 to the outer frame 25 for heat dissipation, thereby prolonging the lifespan of the light-emitting diode members 242.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A sidelight-type backlight module comprising:
    a casing body defining a receiving space and including a side frame strip;
    a light-guiding plate disposed in said receiving space of said casing body and having a side edge that faces toward said side frame strip, said light-guiding plate further having a surface;
    a light-emitting unit disposed at said side frame strip and including a plurality of light-emitting diode members that face toward said side edge of said light-guiding plate;
    a reflector plate disposed at said surface of said light-guiding plate and having an extension part, said extension part extending beyond said side edge of said light-guiding plate that faces toward said light-emitting unit; and
    a reflector component having a light-reflecting face that is spaced apart from said reflector plate, said light-emitting diode members being disposed between said extension part of said reflector plate and said light-reflecting face of said reflector component; said reflector component includes a reflector body made of a light-reflective material, said light-reflecting face being a surface of said reflector body;
    said casing body is substantially frame-shaped, said reflector body of said reflector component and said side frame strip of said casing body being interconnected to form a structure that has a substantially L-shaped cross section, said casing body being made of a light-reflective material.

2. A sidelight-type backlight module as claimed in claim 1, wherein said reflector component includes a reflector body that has a surface, and a light-reflecting film that is secured to said surface of said reflector body and that has said light-reflecting face of said reflector component.

3. A sidelight-type backlight module comprising:
    a casing body defining a receiving space and including a side frame strip;
    a light-guiding plate disposed in said receiving space of said casing body and having a side edge that faces toward said side frame strip, said light-guiding plate further having a surface;
    a light-emitting unit disposed at said side frame strip and including a plurality of light-emitting diode members that face toward said side edge of said light-guiding plate;
    a reflector plate disposed at said surface of said light-guiding plate and having an extension part, said extension part extending beyond said side edge of said light-guiding plate that faces toward said light-emitting unit; and
    a reflector component having a light-reflecting face that is spaced apart from said reflector plate, said light-emitting diode members being disposed between said extension part of said reflector plate and said light-reflecting face of said reflector component;
    said light-emitting unit further includes a flexible circuit board, said light-emitting diode members of said light-emitting unit being disposed on said flexible circuit board, said flexible circuit board having one end extending outwardly of said casing body.

4. A sidelight-type backlight module as claimed in claim 3, wherein said side frame strip is formed with a slit along a lengthwise direction thereof, said side frame strip further having a top face that faces toward said side edge of said light-guiding plate, said top face of said side frame strip being formed with a plurality of first recesses that are arranged along the lengthwise direction of said side frame strip and that are in spatial communication with said slit and said receiving space, said flexible circuit board being disposed inside said slit such that said light-emitting diode members are disposed in said first recesses, respectively.

5. A sidelight-type backlight module as claimed in claim 4, wherein said side frame strip of said casing body is further formed with a plurality of second recesses and that are in spatial communication with said slit, said sidelight-type backlight module further comprising an outer frame that is connected to said side frame strip of said casing body and that has an inner surface, and a plurality of heat-dissipating blocks that are respectively disposed in said second recesses between said flexible circuit board and said outer frame such that said heat-dissipating blocks are in contact with said flexible circuit board and said inner surface of said outer frame.

6. A sidelight-type backlight module as claimed in claim 5, wherein said flexible circuit board has a first face and a second face opposite to said first face, said first face being provided with said light-emitting diode members, said heat-dissipating blocks being secured to said second face of said flexible circuit board.

7. A sidelight-type backlight module as claimed in claim 6, wherein said light-reflecting face of said reflector component is recessed at positions corresponding to said first recesses to form a plurality of inverted-L-shaped pressing shoulders that press against one side of said light-emitting diode members in said first recesses, respectively.

8. A sidelight-type backlight module as claimed in claim 7, wherein said outer frame has a substantially U-shaped cross-section, and includes two first wall parts that are spaced apart from each other and a second wall part that interconnects said first wall parts, each of said first wall parts being disposed at an outer side of a respective one of said reflector plate and said reflector component, said side frame strip being disposed between said light-guiding plate and said second wall part.

9. A sidelight-type backlight module as claimed in claim 3, wherein said side frame strip has a top face facing toward said side edge of said light-guiding plate, said top face of said side frame strip being formed with a plurality of first recesses that are arranged along a lengthwise direction of said side frame strip and that are in spatial communication with said receiving space, said side frame strip being further formed with an elongated second recess that extends along the lengthwise direction of said side frame strip and that is in spatial communication with said first recesses, said sidelight-type backlight module further comprising an outer frame that is connected to said side frame strip and that has an inner surface, and an elongated heat-dissipating block, said flexible circuit board being disposed in said second recess such that said light-emitting diode members are respectively disposed in said first recesses, said heat-dissipating block being disposed in said second recess between said flexible circuit board and said outer frame and being in contact with said flexible circuit board and said inner surface of said outer frame.

10. A sidelight-type backlight module as claimed in claim 9, wherein said flexible circuit board has a first face and a second face opposite to said first face, said first face being provided with said light-emitting diode members, said heat-dissipating block being secured to said second face of said flexible circuit board.

11. A sidelight-type backlight module as claimed in claim 10, wherein said light-reflecting face of said reflector component is recessed at positions corresponding to said first recesses to form a plurality of inverted-L-shaped pressing shoulders that press against one side of said light-emitting diode members in said first recesses, respectively.

12. A sidelight-type backlight module as claimed in claim 11, wherein said outer frame has a substantially U-shaped cross-section, and includes two first wall parts that are spaced apart from each other and a second wall part that interconnects said first wall parts, each of said first wall parts being disposed at an outer side of a respective one of said reflector plate and said reflector component, said side frame strip being disposed between said light-guiding plate and said second wall part.

13. A sidelight-type backlight module as claimed in claim 3, further comprising an outer frame and at least one heat-dissipating block, said outer frame being connected to said side frame strip of said casing body such that said light-emitting unit is disposed between said light-guiding plate and said outer frame, said heat-dissipating block being disposed between and being in contact with said flexible circuit board and said outer frame.

* * * * *